Patented Feb. 8, 1949

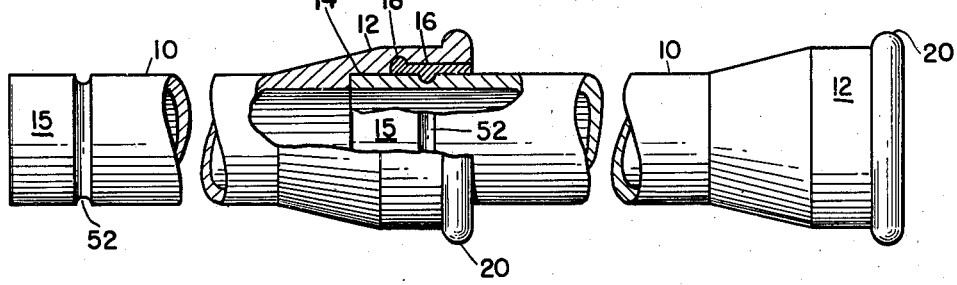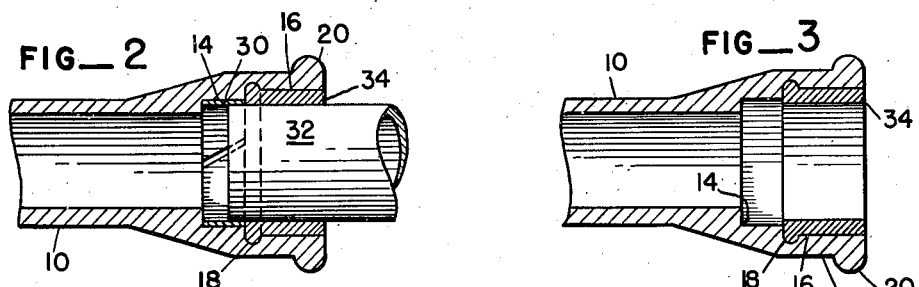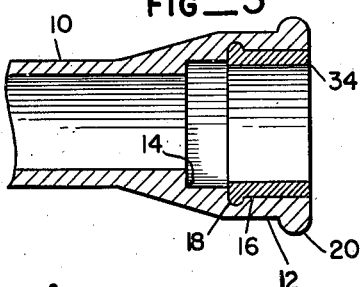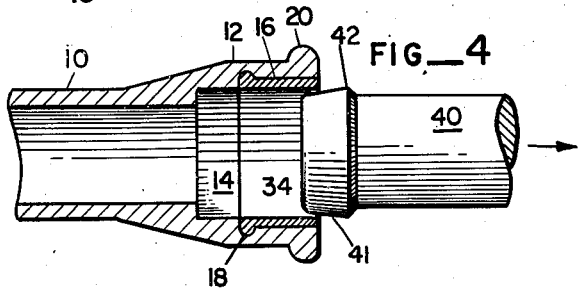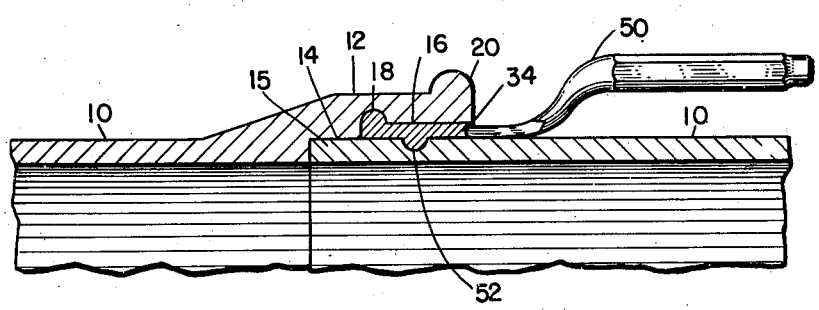

2,461,337

UNITED STATES PATENT OFFICE 2,461,337

PIPE JOINT

Carl W. Miskimen, Seattle, Wash.

Application May 24, 1946, Serial No. 671,959

2 Claims. (Cl. 285—115)

It is a common plumbing practice in the handling of cast iron pipes, and particularly with reference to sealing the joint between hubs and spigots, to first insert the spigot into the hub and then initially and flexibly caulk the space in the hub around the end of the spigot with oakum. The plumber then pours a ring of molten soft metal, such as lead, into the hub around the spigot and when that has cooled sufficiently, he caulks it by pounding and hammering the metal tightly down into the bell, and into close association with the surfaces of both the hub and the spigot.

It is usual for such operations to be conducted under most disadvantageous conditions, usually because the pipes are often assembled in a partially constructed building where the joints are often located inconveniently for the caulking operation. In addition, as is well known, the presence of the slightest amount of moisture, with which the molten metal can contact, results in the production of steam to the end that, at the very least, steam pockets are formed, if not a more serious explosion very dangerous to the plumber as well as a real fire hazard to the building under construction. In some instances, it is usual to temporarily or initially caulk the spigot in a hub by the use of a resilient insert of rubber or the like to facilitate an initial assembly of the various pipe elements. When assembly has been properly effected and the pipes aligned as desired the plumber, in the usual manner, casts in lead and caulks the joint as previously described. Naturally, such resilient inserts are subject to deterioration, and it is often noticed that a leak develops during after years, causing additional expense for repairs that must be effected under the most adverse conditions.

Having in mind these and other defects of the prior art relating to the sealing of pipe joints, it is an important object of this invention to provide a novel pipe hub which is easy to assemble temporarily during erection and is readily caulked tightly about the spigot inserted therein when the assembled pipe structure is to be permanently sealed.

Another object of my invention is the provision, in a hub-and-spigot pipe joint, of a preformed caulkable gasket which will permit the temporary assembly of pipe spigots in their hubs to hold them sufficiently to permit initial alignment by the plumber, and which can have a later caulking operation to provide the final and durable seal in a hub-and-spigot joint.

A still further and more specific object of this invention is the provision of a pipe joint for use in hub-and-spigot piping assemblies, which will not be deleteriously affected or injured during transport from a factory to a point of use, and which will require but a minimum of skill on the part of a plumber or other user in finally positioning them in a pipe assembly.

The foregoing objects and others ancillary thereto I prefer to accomplish as follows:

According to one embodiment of my invention, I shape a pipe bell so that it has an inner counter-bore of a size to receive a spigot end and, outwardly from this inner counter-bore, a gasket counter-bore of greater diametrical size than the inner counter-bore and into which is placed, preferably in a factory, a caulkable metallic material, such as lead and the like, for final peening on the job after a pipe spigot has been inserted therein.

In certain forms of my invention a groove is formed in the gasket counter-bore adjacent the inner counter-bore to insure anchoring of caulkable gaskets in the latter. It is desirable that the caulkable material be placed in the gasket counter-bore in a factory to insure perfect casting and other operations which produce a better gasket. The characteristics or nature of the gasket material, which is usually lead cast in place in the gasket counter-bore, is important in my invention because, when it is ready for assembly, it has a density that is greater than the cast lead would otherwise have. Such increased density is obtained by swaging the gasket material after casting in place by a pressing and wiping operation, which densifies the gasket material.

The novel features that I consider characteristic of my invention are set forth with particularity in the appended claims. The invention itself, however, both as to its organization and method of production, together with additional objects and advantages thereof, will best be understood from the following description of a specific series of steps and of a specific embodiment, when read in connection with the accompanying drawings, in which Figure 1 is a view in detail of a pipe joint according to my invention, with portions broken away for convenience of illustration;

Figure 2 illustrates the method of casting caulkable material in place in my pipe hub;

Figure 3 shows a pipe hub having a cast but unsized gasket in place therein;

Figure 4 demonstrates the step of sizing and densifying the cast-in-place gasket in a pipe hub; and Figure 5 illustrates, in an enlarged, fragmentary, sectional-view, the caulking or final sealing step of my pipe hub in assembling a spigot therein.

A preferred embodiment of my invention, referring to Figure 1 of the drawings, is constituted by pipe 10 having hub 12 at one end thereof. The hub is usually enlarged or belled as shown in the drawing. Hub 12 has interiorly thereof an annular inner counter-bore 14 which is of a diameter suitable to receive a spigot end 15, not perfectly but tight enough to permit such pipe to be initially assembled and erected with rough but fairly accurate alignment.

A second counter-bore 16 of greater diameter than counter-bore 14 is provided in the hub 12 longitudinally outward from bore 14. It is in counter-bore 16 that is placed the gasketing material by a casting operation.

On certain occasions groove 18 is formed in the pipe hub and is of greater diameter than the counter-bore 16. This groove is normally located adjacent the juncture between counter-bores 14 and 16. An exterior annular rim 20 is shown around the bell 12.

Referring to Figure 2, I have shown the bell or hub 12 as having an annular auxiliary and expansible core element 30 placed in the recess 14. A second cylindrical core 32 is inserted in core 30 and has a diameter slightly less than the diameter of bore 14 and also substantially less than the diameter of the spigot end 15. With these elements assembled as shown in Figure 2, the gasket material 34 is cast in place and, when cooled, the core 30 is withdrawn. Then the expansible-contractable core 30 is removed from recess 14 leaving an oversize gasket 34 cast in place, as can be seen in Figure 3. Normally this gasket material is less dense than is desired, and because of its tendency to set-up or "freeze" when striking the metal walls of the recess in which it is being cast it must be sized and compacted and tightly pressed into the recess 16 in which it is placed. This operation is suggested by Figure 4, in which a swaging tool 40 is shown being withdrawn after having been forcefully pressed into the central opening of gasket 34 to compact the same and to tightly press it into place in the recess 16 and, in this instance, in groove 18.

Such a swaging operation is usually performed while the pipe 10 is firmly held against longitudinal or other movement. The swaging or sizing tool is preferably pressed slowly but with force into the opening so that the sloping surface 41 gradually compacts the gasket material outward to the limit hump 42 of tool 40.

A hub gasketed in the manner described is now ready for use, and can be used merely by having the spigot end 15 inserted therein with its innermost end placed in the recess 14, into which it moves with a loose sliding fit. Such a spigot end will be quite accurately aligned in such an initial assembly and the plumber can erect the usual "Christmas tree" roughly in a building without oakum caulked in place. When it has been decided that several assembled pipes are to be caulked the plumber or his helper can employ caulking tool 50 as shown in Figure 5. Such a tool usually has a narrow end that can be inserted in the hub alongside the spigot and against the outer exposed face of the gasket 34. By rapping the end of the caulking tool with a hammer or mallet the material of gasket 34, which is still malleable, will be caused to move and to shift sufficiently to fill the groove 52 ordinarily provided around the spigot end 15. In this way the joint between the hub 12 and spigot 15 will be tightly and substantially permanently sealed.

Although I have shown and described certain specific embodiments of my invention, I am fully aware that many modifications thereof are possible. My invention therefore is not to be restricted except insofar as is necessitated by the prior art and by the spirit of the appended claims.

I claim:

1. In a pipe joint, a pipe bell and a pipe provided with a spigot end, said bell being provided internally with a circumferential cylindrical seat of substantially the same diameter as that of the outside of said spigot end, said seat terminating at its inner end in a circumferential shoulder adapted to abut with the end of said spigot, said bell being provided with an enlarged counter-bore extending from the outer end inward to terminate at the outermost end of said cylindrical seat in a circumferential shoulder, the inner end of said counterbore being provided with a circumferential groove, a malleable metallic cast-in-place and outwardly swaged hollow cylindrical gasket positioned in said enlarged counter-bore and said circumferential groove, said hollow cylindrical gasket being equal in internal diameter to and extending in axial alignment from said cylindrical seat outward substantially to the outer end of said bell, said spigot end being provided with a circumferential groove disposed at a point intermediate the length of the bell counterbore and disposed therewithin, said gasket being extruded into and filling the groove of said bell and closely engaging the outer walls of said bell on either side of said groove.

2. For use in a pipe joint, a pipe bell to receive the spigot end of a pipe in the formation of a joint between two conduits, said bell having an internal cylindrical circumferential seat of substantially the same diameter as that of the spigot end, to be inserted therein, said seat terminating at its inner end in a circumferential shoulder adapted to receive the inserted spigot end in abutment therewith, said bell being provided with an enlarged counterbore extending from the outer end thereof inward to terminate at the outermost end of said cylindrical seat in a circumferential shoulder, the inner end of said counterbore being provided with a circumferential groove, a malleable metallic cast-in-place and outwardly swaged hollow cylindrical gasket positioned in said enlarged counterbore and groove, said hollow cylindrical gasket being equal in internal diameter to and extending in axial alignment from said cylindrical seat outward substantially to the outer end of the bell.

CARL W. MISKIMEN.

REFERENCES CITED

The following references are of record in the file of this patent:

UNITED STATES PATENTS

| Number | Name | Date |
| --- | --- | --- |
| 1,758,454 | Mc Wane | May 13, 1930 |
| 2,347,044 | Frances | Apr. 18, 1944 |